United States Patent [19]

Wei

[11] 4,230,832
[45] Oct. 28, 1980

[54] PROCESS FOR PREPARING RESISTANT VINYL HALIDE POLYMERS

[75] Inventor: Chung H. Wei, Wilmington, Del.

[73] Assignee: Stauffer Chemical Company, Westport, Conn.

[21] Appl. No.: 636,878

[22] Filed: Dec. 2, 1975

Related U.S. Application Data

[60] Division of Ser. No. 497,546, Aug. 14, 1974, abandoned, which is a continuation-in-part of Ser. No. 402,494, Oct. 1, 1973, abandoned.

[51] Int. Cl.$^3$ ............... C08L 27/06; C08F 259/04; C08L 47/00; C08F 2/20
[52] U.S. Cl. ............... 525/260; 525/71; 525/80; 525/82; 525/197; 525/226; 525/227; 525/233; 525/235; 525/255; 525/263; 525/305; 525/308; 526/202; 526/218; 526/229; 526/204
[58] Field of Search ............... 260/876, 879, 884, 899; 526/228; 525/260, 227, 263, 305, 308

[56] References Cited

U.S. PATENT DOCUMENTS

| | | | |
|---|---|---|---|
| 2,565,783 | 8/1951 | Schouteden | 260/89.1 |
| 2,652,392 | 9/1953 | Hohenstein | 260/86.7 |
| 2,996,469 | 8/1961 | Cole | 260/29.7 |
| 2,996,470 | 8/1961 | Cole | 260/29.7 |
| 3,468,859 | 9/1969 | Davies | 526/345 X |
| 3,645,870 | 2/1972 | Sagane | 204/159.17 |
| 3,705,210 | 12/1972 | Mathieu | 260/876 R |
| 3,933,942 | 1/1976 | Kennedy | 260/878 R |

FOREIGN PATENT DOCUMENTS

| | | | |
|---|---|---|---|
| 653574 | 12/1962 | Canada | 260/879 |
| 710894 | 6/1965 | Canada | 260/879 |
| 1093975 | 12/1967 | United Kingdom | 260/879 |

*Primary Examiner*—C. A. Henderson
*Attorney, Agent, or Firm*—Richard P. Fennelly

[57] ABSTRACT

Impact modified polyvinyl chloride is prepared by suspension polymerizing vinyl chloride in the presence of a dual catalyst system of a monomer soluble catalyst and a water soluble catalyst to form suspension polymer particles having irregular and porous surfaces, and then polymerizing, in the presence of the porous particles, monomers for forming gelled rubber-containing interpolymer particles having a Tg of less than 25° C. No emulsification system is required for the rubber interpolymerization. Rubber-containing interpolymer particles in the order of 1 micron or less are formed on the surface of the suspension polyvinyl chloride particle. The process can be conducted in one reaction vessel and product contamination is reduced. The product can be used alone or blended with other thermoplastic polymers, such as polyvinyl chloride, to increase the impact strength thereof.

2 Claims, No Drawings

PROCESS FOR PREPARING RESISTANT VINYL HALIDE POLYMERS

RELATED APPLICATION

This application is a division of copending U.S. application Ser. No. 497,546, filed Aug. 14, 1974, now abandoned, which in turn was a continuation-in-part of applicant's then copending U.S. application Ser. No. 402,494, filed Oct. 1, 1973, also now abandoned.

BACKGROUND OF THE INVENTION

The present invention relates to an improved process for preparing polyvinyl halide polymers having increased impact resistance and increased clarity.

It is a common practice to reinforce rigid plastics as polyvinyl chloride, polymethyl methacrylate, polystyrene, styreneacrylonitrile copolymers and the like with particles of rubber polymers such as polybutadiene and the polyacrylates. The addition of rubber to these common plastics improves their impact strength, that is their ability to withstand a rapidly applied shock. While the addition of rubber improves the impact strength of these plastics, their other physical properties such as tensile strength, clarity, heat distortion temperature, hardness and aging stability, are, however, adversely affected by the rubber. In most cases, the addition of the larger amounts of rubber which would produce the maximum amount of impact strength results in a plastic that is too soft for many uses. The common commercial products, then, are a compromise between the desire to increase impact strength while being able to maintain their other necessary physical properties.

Many references exist which describe how to prepare rubber-reinforced plastics. The rubbery particles can be dispersed in the rigid phase by mill blending or latex blending, or, by polymerizing the hard polymer in the presence of the rubber. The rubber has been shown to exist in the hard polymer matrices as discrete particles of about 0.1 to 5 microns in diameter. See U.S. Pat. Nos. 3,632,679 and 3,644,576.

U.S. Pat. No. 3,661,994 describes the preparation, by means of seeded emulsion polymerization procedures, of multilayered or so-called "sandwich" polymeric particles having a hard inner core and a rubbery outer layer. The latter disclosure notes that such sandwich particles can, per se be blended with rigid plastics or they can, first, have an additional layer of a hard polymer grafted thereon whereupon they may then be blended with rigid plastics. In either case, the thus modified rigid plastics display substantially improved impact strength without deleteriously affecting any other physical properties, such as tensile strength, as has been known to occur when conventionally prepared rubber particles are employed as impact resistance additives for rigid plastics.

However, one of the disadvantages of the latter multilayered or sandwich particles relates to the fact that their outer rubber layer is applied by means of an emulsion polymerization procedure which results in the final particles having a relatively small particle size which, in commercial practice, usually necessitates their isolation by means of a costly, time consuming spray-drying technique or by coagulation with a brine solution which is also time consuming and which may introduce ionic impurities into the polymer. Needless to say, it would be highly desirable to find some means of eliminating such inefficient product isolation and drying procedures.

British Pat. No. 1,015,334 discloses a method for preparing a process aid which, if a crosslinking agent is included, some impact modification may be recognized. The basic process requires polymerization of an acrylate in the presence of a porous vinyl chloride.

Basically, however, all of these procedures have numerous disadvantages in order to achieve the impact strength advantage. The emulsion system requires isolation by means of a costly, time consuming spray drying technique, or by coagulation with a brine solution. The emulsion system also generally requires multiple reaction systems which tie up plant production. Either the spray drying or the coagulation introduces impurities into the polymer. The multilayered sandwich system requires extra steps and is more costly to operate from that standpoint. The process of the British patent can only utilize a very small amount of crosslinking agent, i.e., from 0.01 to 10%, based on the total weight of the acrylates, and preferably only 0.05-1.5%. Needless to say, it would be highly desirable to find some means of preparing polyvinyl halide resins which have improved impact resistance without the inefficiencies of the prior art.

It is an object of the invention to prepare polymer particles which are substantially pure and free from polymerization contaminants, which are easier to handle, which have improved clarity, impact, and reduced haze, by means of an improved process which can be accomplished in a single reaction vessel.

TECHNICAL DISCLOSURE OF THE INVENTION

In accordance with the present invention, there is provided an improved process for preparing impact resistant polyvinyl halide resins which comprises first suspension polymerizing a vinyl monomer, such as vinyl chloride, in the presence of a combination catalyst of a monomer soluble catalyst and a water soluble catalyst. This step of the process provides polymer particles which are thought to have porous or irregularly shaped surfaces. A rubber-containing interpolymer is then prepared in the presence of these polymer particles. No emulsification system is required for the interpolymerization. Yet rubber containing interpolymer particles of less than about 1 micron are formed on the surface of the suspension polymerized vinyl halide. This phenomenon apparently results from the porous surface of the suspension polyvinyl chloride particle trapping the monomers used in forming the interpolymer in small quantities such that isolated polymerization takes place on the suspension polyvinyl chloride surface so that only small rubber containing interpolymer particles are formed. This process can be accomplished in one reaction vessel, quickly and easily, and the product can be washed and handled in the same manner as any suspension grade resin. Since no emulsifiers are used in preparing the interpolymer, the product is cleaner. Since the present invention avoids the necessity of preparing an emulsion of interpolymer first, the emulsifiers are not trapped in the interpolymer and the use of two reaction vessels in a plant is avoided.

It has also been found that certain compositions of the interpolymer when used in the process provide impact resistant polyvinyl chloride blends with little or no haze, and are highly valuable for preparing clear plastic products.

It is important, with respect to this disclosure, to distinguish between the processes of suspension and emulsion polymerization.

Thus, suspension polymerization refers to a method of polymerization whereby one or more monomers is dispersed in a suspension medium which is a non-solvent for both the monomer and the resulting polymer. Generally water is utilized for this purpose and a monomer soluble polymerization initiator is thereupon introduced. Polymerization takes place within the monomer phase containing the polymerization initiator. The use of the suspending medium assists in the dissipation of the heat of reaction and the polymerization reaction is therefore easier to control. Suspension polymerization is generally accomplished by dispersing the monomer in the suspending medium either by constant agitation or by the use of a suspending agent or both. Various suspending agents are known in the art. These known suspending agents include gelatine, hydroxy methyl cellulose, hydroxy ethyl cellulose, hydroxy propyl cellulose, carboxy methyl cellulose, talc, clay, polyvinyl alcohol and the like.

By contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfacial tension between the dispersed and continuous phases. Typical emulsifiers include common soaps, salts of long chain carboxylic and sulfonic acids, alkylated aromatic sulfonic acids and salts of long chain amines.

A water soluble initiator is employed and it is believed that the polymer chains originate in the continuous aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecules or is solubilized in the soap micelle which is present in aqueous soap solutions. As a result, stable polymer emulsions are readily obtained whereas in a suspension polymerization, the resulting polymer particles are of a relatively larger mass which tend to more readily separate out from the suspension.

As can be seen from the foregoing discussion, the catalyst systems utilized for suspension (monomer soluble) and emulsion (water soluble) polymerization act in a chemically different manner. In the former, the polymerization takes place in the monomer phase in which the catalyst is dissolved. In the latter, the polymerization takes place in the aqueous phase in which the catalyst is dissolved. It has been unexpectedly found that these two catalyst systems could be combined in a suspension polymerization system, i.e., using a suspending agent rather than an emulsifying agent, to prepare a porous polymer particle. This porous polymer particle forms one important aspect of the present invention.

THE VINYL HALIDE POLYMER

The vinyl halide polymer of the present invention can be any homopolymer or copolymer of vinyl or vinylidene halide or mixtures thereof. Broadly, the vinyl halide polymer particles are prepared by suspension polymerizing an ethylenically unsaturated monomer composition containing a predominant amount of vinyl halide monomer of the formula:

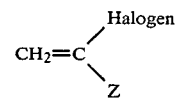

wherein Z is hydrogen or halogen, the term halogen as used herein including fluorine, chlorine, bromine, and iodine. The vinyl halide monomers included within the formula given above that can be used in the present invention include, for example, vinyl fluoride, vinyl chloride, vinyl bromide, vinyl iodide, vinylidene fluoride, vinylidene chloride, vinylidene bromide, vinylidene iodide and the like, though vinyl chloride is preferred. The formula is intended to include all α-halosubstituted ethylenically unsaturated materials which are included within the limits of the formula and which are capable of entering into an addition polymerization reaction. The polymers of the present invention can be formed of the same or different monomer materials falling within the formula and, thus, the invention is intended to cover homopolymers, copolymers, terpolymers, and interpolymers formed by the addition polymerization of the materials falling within the formula. Illustrative of these copolymers is a copolymer of vinyl chloride and vinylidene chloride. The term vinyl halide as used in the claims is intended to include both homo and copolymers of compounds falling within the given formula.

While it is preferred that the monomer composition be comprised totally of vinyl halide monomer, the present invention is also intended to include copolymers formed by the polymerization of a monomer composition containing a predominant amount, e.g., at least 50 percent, of vinyl halide and a minor amount, e.g., up to 50 percent by weight, of another ethylenically unsaturated monomer material copolymerizable therewith. Preferably, the other ethylenically unsaturated monomer material is used in amounts of less than 25 percent by weight and more preferably in amounts less than 10 percent by weight of the total monomer materials used in preparing the polymer. Illustrative of suitable material which can be used to form copolymers, terpolymers, interpolymers and the like are the following: monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1; monoolefinically unsaturated esters including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl, and butyl methacrylate; octyl methacrylate alkyl crotonates, e.g., octyl; alkyl acrylates, e.g., methyl, ethyl, propyl, butyl, 2-ethyl hexyl, stearyl, hydroxyethyl, and tertiary butylamino acrylates; isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alphachloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alpha-bromoacrylate, ethyl alpha-bromoacrylate, methyl alpha-fluoracrylate. ethyl alpha-fluoracrylate, methyl alpha-iodoacrylate and ethyl alpha-iodoacrylate; alkyl alpha-cyanoacrylate, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate, and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide are also useful. Vinyl alkyl ethers and vinyl ethers, e.g., vinyl methyl ether, vinyl ether ether, vinyl propyl ether, vinyl-n-butyl ether, vinyl isobutyl ether, vinyl 2-ethylhexyl ether, vinyl 2-chloro-ethyl ether, vinyl cetyl ether, and the like; and vinyl sulfides, e.g., vinyl $\beta$-chloroethyl sulfide, vinyl $\beta$-ethoxyethyl sulfide and the like can also be included.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether, vinyl chloride and/or vinylidene chloride and propylene. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The monomer soluble catalyst can be any one or more of those normally used for preparing polyvinyl chloride by suspension polymerization techniques. Illustrative of these catalysts are benzoyl peroxide, diacetyl peroxide, azobisisobutyronitrile or diisopropyl peroxydicarbonate, azobis ($\alpha$methyl-$\gamma$-carboxybutyronitrile), caprylyl peroxide, lauroyl peroxide, azobisisobutyramidine hydrochloride, $\tau$-butylperoxypivalate,2,4-dichlorobenzoyl peroxide, azobis($\alpha$-$\gamma$-dimethyl-valeronitrile) are generally used. For use in the preferred catalyst is azobisisobutyronitrile.

The water soluble catalyst can be any one or more of those normally used for preparing polyvinyl chloride by emulsion polymerization techniques. Illustrative of these catalysts are hydrogen peroxide, ammonium, sodium or potassium persulfate, or a redox type such as mixtures of persulfates with alkali metal bisulfites, thiosulfates hydrosulfites, or sodium formaldehyde sulfoxylate. The preferred catalysts are the persulfate type preferably potassium persulfate.

The monomer soluble catalyst is used in an amount of from about 0.005% to about 1.0%, preferably from about 0.02% to about 0.2%, by weight, based on the total weight of the monomer composition used in preparing the suspension vinyl halide polymer.

The water soluble catalyst is used in an amount of from about 0.003% to about 0.6%, preferably from about 0.01% to about 0.1%, by weight, based on the total weight of the monomer composition used in preparing the suspension vinyl halide polymer.

The water soluble catalyst and the monomer soluble catalyst are generally utilized in a ratio of from about 2–3 parts (water soluble) to about $3\frac{1}{2}$ to $4\frac{1}{2}$ parts (monomer soluble) and preferably from about $2\frac{1}{2}$ parts to about 4 parts.

In general, these catalyst amounts are sufficient to provide desired results. However, speed of catalyst initiation and molecular weight may require slight adjustments. However, these adjustments are well within the skill of the art.

The suspension polymerization is usually conducted in a sealed pressure vessel equipped with an agitator and temperature control device. The suspension polymerization is usually conducted in the presence of a suspending agent such as those outlined hereinbefore. The preferred suspending agent is polyvinyl alcohol. The suspending agent is generally use in an amount of from about 0.01 to 5.0%, by weight, based on the total weight of the monomer composition. Since the type and amount of suspending agent used has, as is known, some influence on the particle size of the product finally obtained, the type and exact amounts of suspending agent should be selected by the skilled artisan so as to provide particle sizes of the suspension polyvinyl halide polymer within the range of from about 20 to about 250 microns and preferably from about 70 to about 120 microns. These particle sizes are important in providing an effective impact resistant resin.

The polymerization is conducted using normal suspension polymerization temperature, i.e., 104° F. to 185° F. Preferably temperatures of about 150° F. to 170° F. are utilized.

Various other additives, such as thermal stabilizers, and the like, which are normally utilized in suspension polymerization can also be included. In the preferred embodiment, a heat stabilizer which is an epoxidized soy bean oil, is included in the suspension polymerization recipe in an amount of from about 0.1% to about 1%, by weight, based on the weight of the monomer composition.

The suspension polymerization sequence can incorporate or utilize any of the known techniques for controlling or modifying molecular weight distribution, such as Hwa et al. U.S. Pat. No. 3,711,576, or Heckmaier et al. U.S. Pat. No. 3,033,839. It is also contemplated to be within the scope of the invention to polymerize the vinyl halide monomers in the presence of preformed rubber particles as in the previously discussed prior art, though this procedure is less preferred. Any other techniques normally utilized to prepare suspension polymers which do not conflict with the utilization of the mixed catalyst system of the invention are intended to be included in the present invention.

The suspension polymerization should be allowed to go to at least 60% completion before termination. Preferably, the polymerization is allowed to proceed to 80–90% completion. Upon completion of the suspension polymerization, the suspension polymer is isolated. In the preferred continuous process of the invention, this involves stripping the reaction system of any unreacted monomer. Unreacted monomer interferes with the subsequent interpolymerization and therefore must be removed. The product can also be isolated as a wet cake or dried. However, these procedures are less preferred.

While the porous particle is primarily intended for use as a basis for an impact modified resin, the porous particle can also be used by itself, i.e., as a normal suspension grade polyvinyl chloride. The polymer can be coblended with other resins, plasticizers, or used as a basis for other polymer products such as process aids as outlined in British Pat. No. 1,015,334. The porosity may have an effective advantage in preparing a blotter type resin.

RUBBER CONTAINING INTERPOLYMER

The rubber containing interpolymer is prepared in the presence of the suspension resin particles described hereinbefore. In the preferred method, the interpolymer is prepared in the same aqueous system used to prepare the suspension particles. If wet cake or dried suspension particles are to be used, these must be reslurried in water. A small amount of additional suspending agent may be required in the use of wet cake or dried polymer to facilitate reslurrying.

The monomers used to prepare the rubber containing interpolymer are those normally used in the art to prepare impact modifiers. Thus, the rubber containing interpolymer can be any polymer or copolymer having a Tg less than about 25° C. that can be polymerized by free radical techniques. The rubber containing interpolymer should, preferably, be crosslinked so it can retain its size and shape during the polymer processing. This crosslinking can be achieved during the polymerization if a divinyl or diene crosslinkable comonomer is included in the polymerization recipe.

Examples of rubbers that can be used are the acrylic, isoprene and butadiene rubbers including poly(1,3-butadiene), polyisoprene and polymers of the $C_2$-$C_8$ alkyl acrylates such as poly(butyl acrylate), poly(ethyl acrylate), poly(ethylhexyl acrylate), and poly(n-octyl acrylate) which are preferably crosslinked with small quantities of divinyl monomers such as divinyl benzene or 1,3-butylene dimethacrylate. Also useful are copolymers of 1,3-butadiene, isoprene and the $C_2$-$C_8$ alkyl acrylates with each other and with minor proportions of one or more of such vinyl monomers as styrene; acrylonitrile; vinyl acetate; methyl methacrylate; ethylenically unsaturated carboxylic acids such, for example, as acrylic, methacrylic, itaconic and maleic acids; isoprene; chloroprene; ethylene and other common vinyl monomers.

The rubber containing interpolymer can also be prepared using a polyacrylate monomer system in combination with a gell inducing monomer which is free of conjugated unsaturation.

The polyacrylate component is produced from a monomeric material free of conjugated unsaturation and containing (1) at least 80% by weight of one or more monomeric alkyl acrylates in which the alkyl group contains from 2 to 8 carbon atoms, (2) up to about 19.5% by weight of one or more monovinylidene monomers (i.e., a monomer containing a single vinylidene ($CH_2$=$C<$) group per molecule) copolymerizable with the alkyl acrylate and (3) from about 0.5 to about 8% by weight, more preferably from about 1 to about 4% by weight., of a gel-inducing monomomer which is free of conjugated unsaturation, which is copolymerizable with the alkyl acrylate and selected from the class consisting of (1) the monomeric acrylic polyesters of polyhydric alcohols and of an acrylic acid selected from the class consisting of acrylic acid and methacrylic acid, which polyesters contain from 2 to 6 acrylic ester groups per molecule, and (2) the polyalkenyl polyesters of polyhidric alcohols containing from 2 to 6 alkenyl ether groups per molecule and in which the alkenyl ether groups are each present in the structure $CH_2$=$C<$.

Thus, the polyacrylate component is prepared from one or more of ethyl acrylate, propyl acrylate, n-butyl acrylate, isobutyl acrylate, and others. The most preferred polyacrylate is prepared from n-butyl acrylate.

In addition, there may be employed (though not preferred) small amounts (i.e., up to 19.5% by weight) of other monovinylidene monomers such as vinyl acetate, vinyl chloride, vinylidene chloride, acrylonitrile, methyl methacrylate, styrene, alkyl acrylates in which the alkyl group is methyl or contains more than 4 carbon atoms such as 2-ethylhexyl acrylate, vinyl ethyl ether, vinyl ethyl ketone, acrylamide, 1-monolefins such as ethylene, propylene, n-butene, 2-ethyl hexene-1 and others.

Suitable gel-inducing monomers of the above defined class include the acrylic polyesters of polyalkylene glycols such as diethylene glycol diacrylate (abbreviated hereinafter as "DEGDA"), diethylene glycol dimethacrylate, trimethylene glycol diacrylate, butylene glycol diacrylate, pentamenthylene glycol diacrylate, glyceryl diacrylate, glyceryl triacrylate, octylene glycol diacrylate, trimethylol propane triacrylate (hereinafter abbreviated as "TMPTA"), triamethylol propane trimethacrylate, the tetraacrylate ester of pentaerythritol, and others, and the poly alkenyl polyethers in which the double bonds of the alkenyl ether groups are present in the terminal vinylidene $CH_2$=$C<$ group such as are produced by the Williamson synthesis in which a suitable alkenyl halide such as allyl bromide is reacted with an alkaline solution of a polyhydric alcohols derived from sugar and related carbohydrates such as sucrose, maltose, fructose, and the like, an illustrative monomer of this latter type being a polyallyl ether of sucrose containing 2, 3, 4, or more allyl ether groups per molecule, and many others.

All of the foregoing systems are well known in the prior art such as U.S. Pat. No. 3,632,679. Levels of ingredients and the like can be readily ascertained by those skilled in the art.

Preferably, the rubber containing interpolymer is of the butadiene-acrylonitrile type, and more preferably of the butadiene-acrylonitrile-acrylate type. In a preferred embodiment, an interpolymer of butadiene, butyl acrylate and acrylonitrile has been found to provide effective results. Processability of the system is improved by the addition of the methyl methacrylate as a monomer. A particularly effective recipe comprises:

63.5%: Butadiene
8.5%: Butyl Acrylate
13.5%: Methyl Methacrylate
14.5%: Acrylonitrile The foregoing recipe is also particularly desirable since the calculated refractive index is approximately 1.538. The refractive index of polyvinyl chloride is 1.539. Since the indices of refraction are close, the ultimate polymer products and blends thereof with polyvinyl chloride are characterized by good clarity and low haze. For this reason, the present invention intends to include a specific formulation having the following composition:
Butadiene: 62–65%
Butyl Acrylate: 7–10%
Methyl Methacrylate: 12–15%
Acrylonitrile: 12–16%

This composition provides not only improved impact resistance but good clarity in the final product.

Impact resistance is also desirable in systems which are not critical to haze values, such as pigmented systems. Other ratios of the rubber forming monomers can be used if desired with similar results as to impact resistance. Thus, applicant's invention is not intended to be limited to the specific formulation outlined above. Any rubber containing interpolymer having a glass transition temperature (Tg) of less than 25° C. can be utilized.

The monomers used to prepare the rubber containing interpolymer are polymerized in a reaction vessel similar to that used in preparing the suspension polyvinyl halide particles. Additional free radical generating polymerization catalyst is generally added. This catalyst is preferably of the monomer soluble type outlined above such as azobisisobutyronitrile. The catalyst can be used in amounts of from about 0.03 to about 3% by weight based on the total weight of the monomers used to prepare the interpolymer.

In order to prepare an effective impact resistant polymer, sufficient monomer must be added to provide at least about 2%, by weight, rubber containing interpolymer based on the total weight of the final product. Interpolymer amounts above about 20% can also be prepared. The preferred amount of rubber containing interpolymer is between 6% and 12% and more preferably between 8% and 12%.

The interpolymer is prepared using normal polymerization conditions, i.e., catalyst, agitation during polymerization and temperatures of about 130° F. to 170° F. Optional ingredients such as heat stabilizers such as tris-nonylphenyl phosphite, can also be included. Since this type of heat stabilizer is highly viscous, uniform distribution can be effected by premixing the heat stabilizer with the acrylate monomers prior to adding the same to the reaction vessel.

The polymerization is conducted until a desired degree of polymerization is attained. Since the conversion of the butadiene is an important factor in the ultimate impact resistance of the final product, the greater the conversion of the butadiene in the reaction the more impact strength observed. Polymerizations terminated at 10 psig final pressure produced slightly less impact resistance than those reacted longer and terminated at 5 psig final pressure.

For purposes of heat stability and prevention of reactor fouling, it is also desirable to include a small amount (0.1–5%) of sodium bicarbonate in the polymerization recipe.

Upon completion of the polymerization the polymer can be separated, washed, and dried. Optional ingredients such as additional stabilizers and acid neutralizers (carbonates) can also be added.

The products of the present invention are impact resistant polyvinyl halide polymers. These materials can be used in any conventional manner including the formation of sheet, rod, molded products, films and the like. Conventional pigments, dyes, lubricants, ultraviolet and thermal stabilizers, and flame retardants can be admixed therewith.

The products of the present invention can be used alone or admixed with other rigid plastics to reinforce the same.

Rigid plastics that can be reinforced by the introduction of the particles of this invention include polyvinyl chloride (PVC), polystyrene (PS), poly(methyl methacrylate) (PMMA), co-poly(styrene-acrylonitrile), polymethacrylonitrile (PMAN), and all the common rigid copolymers of these plastics, e.g., co-poly (vinyl chloride-vinyl acetate), co-poly(methyl methacrylate-ethyl acrylate) and ter-poly(methyl methacrylate-acrylonitrile-styrene). The particles may be dispersed in the rigid plastics by mill blending or by blending them in the form of solid powders. The preferred plastic for blending is polyvinyl chloride. The amount utilized can be any amount since the more that is added, the greater the improvement in impact. Blends of 90% rigid plastic/10% polymer of the invention to 10% rigid plastic/90% polymer of the invention can be formed. Ratios of 30/70, 70/30, and 50/50 rigid plastic to polymer of the invention have been found to be effective.

The invention is further illustrated in the Example which follows.

EXAMPLE

An impact resistant polyvinyl chloride was prepared in accordance with the present invention as follows:

| Monomer Charge - Suspension Polymerization | |
|---|---|
| Vinyl chloride | 11,350 |
| Suspending Agent (Polyvinyl alcohol) | 40 Lbs. |
| Water Soluble Catalyst ($K_2S_2O_8$) | 2½ Lbs. |
| Monomer Soluble Catalyst (azobisisobutyronitrile) | 4 Lbs. |
| Heat Stabilizer (Epoxidized Soybean Oil) | 50 Lbs. |
| Deionized Water | 2,500 Gals. |

Polymerization Procedure (1) Charge 2,500 gallons of deionized water to polymerization kettle.
(2) Turn on slow speed agitation.
(3) Charge 2½ pounds of $K_2S_2O_8$.
(4) Charge 40 pounds of polyvinyl alcohol suspending agent.
(5) Agitate for at least 20 minutes and bring water temperaure to 140° F.
(6) Charge 50 pounds of heat stabilizer.
(7) Turn off agitator.
(8) Charge 4 pounds azobisisobutyronitrile.
(9) Purge the reactor 2 times with vinyl chloride monomer.
(10) Charge 11,350 pounds vinyl chloride monomer.
(11) Turn on fast agitation.
(12) Adjust temperature to polymerization temperature 160° F.
(13) React batch to 10 pound pressure drop.
(14) Fast vent down to about 0 psig reactor pressure.
(15) Slow vent holding jacket temperature at 190° F. during entire slow vent operation. Hold batch at maximum vacuum for 30 minutes.
(16) Cool to 100° F.
(17) Turn on slow speed agitation.

| Monomer Charge - Rubber Containing Interpolymer | |
|---|---|
| Butadiene | 568 Lbs. |
| Butyl Acylate | 80 Lbs. |
| Methyl Methacrylate | 120 Lbs. |
| Acrylonitrile | 128 Lbs. |
| Heat Stabilzer | |
| (tris-nonylphenyl phosphite) | 20 Lbs. |
| Azobisisobutyronitrile | 15 Lbs. |
| Sodium Bicarbonate | 20 Lbs. |

Post Addition

Butylated Hydroxytoluene: 10 Lbs.
Sodium Carbonate: 250 Lbs.
Deionized Water: 200 Lbs.

Polymerization Procedure (1) Charge 20 pounds $NaHCO_3$.
(2) Charge 15 pounds azobisisobutyronitrile.
(3) Premix heat stabilizer with butyl acrylate, methyl methacrylate, and acrylonitrile.
(4) Charge monomer pre-mix.
(5) Purge the reactor 2 times with butadiene.
(6) Charge 568 pounds butadiene.
(7) Turn on fast agitation.
(8) Adjust temperature to polymerization temperature (150° F.).
(9) React batch to a 5 pound final pressure, then charge 10 pounds butylated hydroxy toluene.
(10) Slow vent while holding jacket temperature at 180° F. during entire slow vent operation, hold batch at maximum vacuum for 15 minutes.
(11) Charge 250 pounds $Na_2CO_3$ solution through charge pot.
(12) Cool batch to 100° F., then transfer the batch.
(13) Dry product.

The final product has the following characteristics:

| Color: | White | |
|---|---|---|
| Screen: | 40 Mesh | - 0 |
| | 140 Mesh | <20% |
| | 200 Mesh | <50% |
| | thru 200 Mesh | >20% |
| Rubber Content(%) | | 6%–10% |

The product was tested for impact strength using the falling dart impact strength test. An impact strength of about 2.9 inch-pounds/millimeter was obtained. The haze value of a clear, fused product prepared from the polymer of the Example was 40%. Forty percent haze is considered clear.

The impact test and the haze test were both conducted using a sample prepared by blending 50% of the product of the Example and 50% of polyvinyl chloride homopolymer. The sample had a 20 mil gauge thickness.

In summary, the present invention allows for the preparation of an impact resistant, polyvinyl halide polymer containing a rubber interpolymer without the necessity of emulsion polymerization of the rubber interpolymer in a unit one kettle system providing a product which when blended with polyvinyl chloride provides a product having impact resistance and good clarity.

Using a sample of rubber containing polymer prepared in the same manner as in the Example and containing about 7% interpolymer, the following test results were obtained:

| I. | SCC-608 + 7% R and H Km 461 | 0.8 ft. Lb./inch |
|---|---|---|
| | + 5.2% R and H Km 461 | 0.6 ft. Lb./inch |
| | Product of Invention (100%) | 2.5 ft. Lb./inch |
| | Blend 70% Product of Invention | |
| | 30% SCC 608 | 1.5 ft. Lb./inch |
| | (All the above samples were injection molded.) | |

| II. | SCC-608 + 5.2% R and H Km 461 | .75 ft. Lb./inch |
|---|---|---|
| | Product of Invention | 1.5 ft. Lb./inch |
| | Blend 70% Product of Invention | |
| | 30% SCC 608 | 1.0 ft. Lb./inch |
| | (All the above samples were compression molded.) | |

SCC 608 is a commercial grade polyvinyl chloride homopolymer, Stauffer Chemical Company.

R and H Km 461 is a commercial grade impact modifier, Rohm and Haas.

All tests were run using notched Izod test, results are per inch of notch.

Also, impact resistance at low levels of additives can be provided. This important when preparing solid polymer articles which are to contact food or drugs. Governmental regulations limit the amount of total additives to the base polymer. Hence, the ability to achieve a higher level of impact resistance while allowing for the other additives needed to process the resin is desirable.

The invention is more fully defined in the claims which follow.

What is claimed is:

1. In a process for forming an impact resistant vinyl chloride polymer by first forming a porous vinyl chloride polymer by suspension polymerization using a suspending agent followed by polymerizing a monomer composition adapted to form a rubber containing interpolymer having a Tg of less than 25° C. in the presence of the porous vinyl chloride polymer, wherein the improvement comprises using a catalyst system of from about 0.003% to about 0.6% by weight of a water soluble, free radical polymerization catalyst in combination with from about 0.005% to about 1.0% by weight of a monomer soluble, free radical polymerization catalyst during the suspension polymerization of the vinyl chloride and using polyvinyl alcohol as the suspending agent.

2. A process as claimed in claim 1 wherein said water soluble catalyst is potassium persulfate and said monomer soluble catalyst is azobisisobutyronitrile.

* * * * *